3,085,102
PROCESS FOR PRODUCING ALKYL TIN HALIDE COMPOUNDS
Taizo Yatagai, Nishinomiya City, Sumio Matsuda, Sakai City, and Haruo Matsuda, Osaka City, Japan, assignors to Nippon Shokubai Kagaku Kogyo Co., Ltd., Suita City, Japan, a corporation of Japan
No Drawing. Filed Apr. 11, 1960, Ser. No. 21,140
Claims priority, application Japan Apr. 15, 1959
4 Claims. (Cl. 260—429.7)

The present invention relates to a process for producing tin alkylhalide compounds and more particularly to a process in which alkyl tin halide compounds can be produced directly and easily from alkyl halide and a metallic tin with a good yield.

An object of the present invention is to provide a process for the production of dialkyl-tin-oxides and other alkyl tin halide compounds more easily and inexpensively in comparison with the conventional processes; the said compounds being used as the raw material of the stabilizer for synthetic resin containing chlorine, such as vinyl chloride.

Another object of the present invention is to produce tin alkyl halide compounds with a considerable higher yield and in a short period of time.

Still another object of the present invention is to obtain tin alkyl halide compounds in high purity with a good yield by distillation under reduced pressure.

Other objects, features and advantages of the present invention will be apparent from the following description.

The inventors of the present application have executed numerous experiments and laborous studies for a long time in regard to various kinds of addition substances, which have catalytic action in order to promote the reaction of metallic tin and alkyl halide in the production of the desired tin alkyl halide compounds from the said starting materials and came to the conclusion that when the reaction is carried out with the addition of a small quantity of metal other than tin and a suitable organic solvent to the said starting materials, the desired tin alkyl halide compounds can be produced easily with a good yield. The present invention is based on the finding just stated above and its characteristic feature resides in that the reaction of metallic tin with alkyl halide is effected in the presence of one kind of organic solvent containing alcohols, ethers, esters, or tetrahydrofuran as its principal constituent or a mixture consisting of at least two kinds of them and a metal other than tin or their mixture consisting of at least two of them.

According to this invention, tin alkyl halide compounds can be produced easily with a good yield and in a short period of time, for example, in 3–5 hours and further these products can be purified by the distillation under reduced pressure.

In the present invention, various kinds of metals other than tin, such as Al, Mg, Si, Ca, Ti, V, Cr, Mn, Fe, Co, Ni, Cu, Zn, Zr, Mo, Cd, Sb, W, Hg, Pb and Bi can be used alone or in their mixture.

Furthermore, the alkyl group to be used in the present invention contains one to twelve carbon atoms.

Various processes for producing dialkyl tin iodides directly from alkyl iodide and tin have hitherto been attempted. In these processes, however, the reaction must be carried out at a high temperature or in a sealed tube, the conversion rate of tin is also very low, side reactions occur in most cases, and further it is very difficult to obtain the desired dialkyl tin diiodide in a pure state. Consequently, the following procedures are needed to purify the product, that is, the crude dialkyl tin diiodide compound is hydrolyzed and the crude tin dialkyl oxide thus obtained is then treated with a hydrochloric acid, after which dialkyl tin dichloride is purified by distillation.

According to the present invention the desired product can be produced with a considerable high yield, which could hitherto not be expected, without any defects of the conventional processes.

When in the reaction of a metallic tin with alkylhalide according to the present invention an alkylhalide, for example alkyl iodide is used as a starting material, 0.1 to 1.0% by weight, based upon the weight of tin, of one or more kinds of metals other than tin and 1.0 to 5.0% by weight, based upon the weight of alkylhalide, for example alkyl iodide, of one kind of organic solvent containing alcohols, esters, ethers or tetrahydrofuran as its principal constituent or their mixture consisting of two or more kinds of them are added to the starting materials, a metallic tin and alkylhalide, and then heated with stirring for 3–5 hours under a normal pressure or heated in a sealed vessel at a temperature ranging from 100° C. to 200° C., whereby the desired alkyl tin halide can be obtained. When tin containing somewhat impurities is used at that reaction, the addition of the said other metals can be dispensed with. However, when only the metal other than tin is added and organic solvent is absent, the yield of the product becomes extremely low.

In the present invention, furthermore, the said reaction can similarly be carried out using as an addition substance a small quantity of organometallic compound, which can be produced by previously reacting a metal, for example magnesium with alkyl iodide and dissolving the reaction product in the said organic solvent. However, the metals to be used for the production of the said organometallic compounds can also involve tin.

When alkyl bromide, alkyl chloride or the like is used as the starting alkylhalide, 5–20% by weight, based upon the weight of tin, the alkyl iodide or the said organometallic compounds besides metal other than tin and the organic solvent may be used as the addition substances and in this case the reaction can be completed in 3–10 hours in a sealed vessel.

According to the present invention, when, for example methyl iodide or ethyl iodide is used as a starting material, the product can be produced, admixed with the compound represented by the following formula: $R_nSnX_{4-n}$ (wherein R shows a saturated alkyl group whose number of carbon atoms is 1 to 12, X a halogen, preferably iodine, bromine and chlorine, and $n$ is 1, 2 or 3), and when the alkyl group is alkyl iodide is of propyl or higher, the product consisting substantially of only dialkyl-type compounds can be obtained, whereas when alkyl bromide or alkyl chloride is used as a starting material the product is produced in admixture with the compounds represented by the following formula, $R_nSnX_{4-n}$, irrespectively of the kind of alkyl group used.

These admixed components can be isolated by distillation and other usual processes.

With regard to the proportion of the amount used of the starting materials, tin and alkyl halide, in the present invention, it is a matter of course that the more the amount used of alkyl halide is excess the more the reaction proceeds easily, but in the practice it is most convenient for operation when the ratio of tin to alkylhalide is about 1 mole:2.0–4.0 moles.

In the present invention, to use metal other than tin as the addition substance is for the sake of an increase in yield and the organic solvent is used in the present invention for the reason that the said solvent can play an important part in the progression of the reaction.

Moreover, after numerous experiments, it has been found that the amount used of metal other than tin is most adequate at about 0.1–1.0% by weight, based upon the weight of tin, and that an addition of more further quantity provides the cause for coloring of the products. On the other hand, when only the organic solvent is used without adding the metal other than tin, such as metallic magnesium, the yield drops down to some degree and becomes 60 to 70%, while when both the metal other than tin, such as magnesium and the organic solvent are used, the yield can amount to 90 to 98% of the theoretical yield. This is the reason why the metal other than tin, such as magnesium and the organic solvent are used in the present invention. The amount used of the organic solvent is appropriate at 1.0 to 10.0% by weight, based upon the weight of alkyl halide, and even when some more quantity is further used, any better result can not be expected. On the contrary, at less than 1.0% the yield drops down extremely.

The order of addition of the both addition substances is indifferent with the reaction, and they may well be mixed with the starting materials before the beginning of reaction.

With regard to the reaction temperature, it is generally appropriate at a temperature near the boiling point or within the range of from boiling point to about 200° C. in the case where alkyl halide containing not less than three and not more than twelve carbon atoms in its alkyl group, more particularly alkyl iodide such as propyl iodide, butyl iodide, amyl iodide or dodecyl iodide is used, and the reaction may be carried out with stirring within the range of these temperatures under normal pressure. At higher than the said temperature, the starting materials and the product are partially decomposed, and consequently, this is inconvenient for the purpose of the present invention. When alkyl halide containing one or two carbon atoms in its alkyl group and boiling at a low temperature, such as methyl iodide, or ethyl iodide is used, it is desirable that the reaction is carried out in an autoclave at about 100–200° C., preferably at from 120° C. to 140° C.

In general, alkylhalide having long carbon chain, such as decyl iodide is low in reactivity, and as a result the yield of the product drops down considerably, for example to about 30% in case of decyl iodide. When the reaction time is too long, there occur the unfavourable results, for example marked coloring of the products and increase in the amount of the side reaction products, and consequently, the reaction time is considered to be most proper at about 3 to 5 hours in the case of alkyl iodide, and 3 to 10 hours in the case of alkyl bromide and alkyl chloride. On the other hand, as the alkyl tin halide compound produced, such as dialkyl tin diiodide is apt to deteriorate with the lapse of time, it is necessary to convert as soon as possible the products into dialkyl tin oxide by hydrolysis.

The following examples illustrate the way in which the process according to the present invention may be carried out in practice.

*Example 1*

A mixture of 2.4 moles of n-butyl iodide, 1 mole of tin foil, 13.2 gr. of n-butanol and 0.24 gr. of magnesium powder (or 0.12 gr. of magnesium powder and 0.12 gr. of zinc powder) was boiled with stirring in a flask of 1 liter, at which time the temperature was raised gradually with the progression of the reaction, and then the reaction was carried out for 3 hours at 130–140° C. After cooling, the excess of n-butyl iodide and the side reaction products with low boiling point were distilled off. The product, tin di-n-butyl diiodide, was obtained at 143–145° C./3 mm. Hg by distillation in vacuum. Yield was 95%, based upon the quantity used of tin.

The yield remains unchanged even where cyclohexanol is used in place of n-butanol, 87.3% when butyl acetate used, and 80% when ethanol used, respectively.

Furthermore, in place of the magnesium and zinc, copper, titanium, mercury or bismuth can similarly be used in an amount of 0.1–1.0% by weight, based upon the weight of tin.

*Example 2*

When a mixture of 20 gr. of tin foil, 0.04 gr. of magnesium, 53.7 gr. of methyl iodide and 1.6 gr. of methanol was reacted in a stainless autoclave for 2 hours at the reaction temperature of 135° C., whereby tin was utilized completely and 61 gr. of the mixture which is represented by the general formula $(CH_3)_nSnI_{(4-n)}$ ($n=1$, 2 or 3) consisting mainly of 27.1 gr. of tin dimethyl diiodide was obtained. Furthermore, in place of the said magnesium, bismuth, antimony, strontium, silicon or tungsten can be used in an amount of 0.1 to 1.0% by weight, based upon the weight of tin.

*Example 3*

When a mixture of 0.3 mole of n-butyl bromide, 0.1 mole of tin foil, 0.1 gr. of magnesium powder, 1 gr. of n-butanol and 2 gr. of n-butyl iodide was reacted in an autoclave for 8 hours at 160° C., the tin was utilized completely. After completion of the reaction, the low boiling-point fraction was distilled off. 34 gr. of the mixture which is represented by the general formula $(n-C_4H_9)_nSnBr_{(4-n)}$ ($n=1$, 2 or 3) consisting mainly of tin-di-n-butyl dibromide was obtained by distillation in vacuum.

Furthermore, in place of the said magnesium, chromium, manganese, molybdenum or vanadium can be used in an amount of 0.1 to 1.0% by weight, based upon the weight of tin.

*Example 4*

About 50 gr. of methyl chloride was introduced into an autoclave charged with a mixture of 20 gr. of tin foil, 0.2 gr. of magnesium powder, 1.6 gr. of n-butanol and 3.4 gr. of n-butyl iodide, and the resultant mixture was reacted at 190° C. for 6 hours, whereby tin was utilized completely, and 35 gr. of the mixture which is represented by the general formula $(CH_3)_nSnCl_{(4-n)}$ ($n=1$, 2 or 3) consisting mainly of $(CH_3)_2SnCl_2$ was obtained.

Furthermore, the similar result can be obtained when 10 gr. of tetrahydrofuran is used in place of the n-butanol, and copper, cadmium or aluminium can be used in an amount of 0.1–1.0% by weight, based upon the weight of tin, instead of the magnesium.

*Example 5*

About 8 gr. of a solution of magnesium n-butyl iodide in n-butanol prepared by the following procedure was added to a mixture of 74.5 gr. of n-butyl iodide and 20 gr. of tin foil, and the resulting mixture was reacted at 130 to 140° C. for 2 hours, whereby tin was utilized completely, and di-n-butyl tin diiodide was obtained: the yield was 95% of the theoretical yield.

The said solution of magnesium n-butyl iodide in n-butanol can be prepared by reacting 2 gr. of magnesium with 20 gr. of n-butyl iodide in 40 gr. of tetrahydrofuran and dissolving the resultant mixture in 90 gr. of n-butanol. An organometallic compound prepared by the use of prepared by the use of n-butyl bromide in place of n-butyl iodide can also be used in this reaction.

*Example 6*

To a mixture of 103.9 gr. of n-butyl bromide and 30 gr. of tin foil were added 5.4 gr. of n-butyl magnesium iodide and 2.5 gr. of n-butanol, and the resultant mixture was reacted in an autoclave at 160° C. for 8 hours, whereby tin was utilized completely and 90 gr. of the mixture represented by the general formula $(n-C_4H_9)_nSnBr_{(4-n)}$ ($n=1$, 2 or 3) was obtained.

*Example 7*

To a mixture of 86 gr. of n-propyl iodide and 25 gr. of tin foil were added 1.4 gr. of n-propyl magnesium bromide and 2.6 gr. of n-propanol, and the resultant mixture was then reacted with stirring for 3 hours at 130°

C. to 140° C. under normal pressure, whereby 90% of tin was utilized, and di-n-propyl tin diiodide was obtained; yield was 82.7%.

*Example 8*

A mixture of 30 gr. of tin foil, 0.3 gr. of magnesium, 70.3 gr. of butyl chloride, 6 gr. of butyl iodide, 2.5 gr. of butanol and 20 gr. of tetrahydrofuran was reacted in an autoclave at the reaction temperature of 160° C. for 8 hours, whereby tin was utilized completely, and 20.8 gr. of the mixture which is represented by the general formula (n—$C_4H_9$)$_n$SnCl$_{(4-n)}$ consisting mainly of di-n-butyl tin dichloride was obtained.

*Example 9*

A mixture of 25 gr. of tin foil, 0.05 gr. of magnesium, 84.0 gr. of propyl iodide and 2.5 gr. of propyl alcohol was boiled with stirring at the boiling point of the said mixture, at which time the temperature was raised up to about 140° C., and the reaction was carried out 3 hours, whereby 90% of tin was utilized. After the solid material was filtered off and the unreacted materials were distilled off, the product, dipropyl tin diiodide, was obtained by distillation of the residue under reduced pressure: yield was 82.7% of theory.

Furthermore, when propyl acetate and propyl ether were used in this reaction in place of the said propyl alcohol, the same product was produced in ca. 78.0% and 75.0% yield respectively.

*Example 10*

To a mixture of 35 gr. of tin foil and 177 gr. of n-octyl iodide were added 0.07 gr. of magnesium and 5.3 gr. of n-octanol, and the resultant mixture was reacted at 180° C. with stirring on an oil bath for 3 hours. After the reaction was completed, the resultant mixture was treated under reduced pressure, whereby di-n-octyl tin diiodide was obtained. In this reaction, the reaction rate of tin was 62.9% and the yield of the desired product was 46.5%.

Furthermore, iron, cobalt or nickel can also be used in an amount of 0.1–1.0% by weight, based upon the weight of tin, in place of the said magnesium.

*Example 11*

A mixture of 35 gr. of tin foil, 210 gr. of n-dodecyl iodide, 0.07 gr. of magnesium and 6.3 gr. of n-dodecyl alcohol was treated in the same manner as in Example 10. After the reaction mixture was filtered and the filtrate was cooled, di-n-dodecyl tin diiodide was crystallized, and the fine product having M.P. 46.5° C. to 48° C. could be obtained by recrystallization from petroleum-benzine, and the reaction rate of tin in this example was 47.2%.

*Example 12*

To a mixture of 74.5 gr. of n-butyl iodide and 20 gr. of tin foil were added 4.4 gr. of di-n-butyl tin diiodide and 2.3 gr. of n-butanol, and the resultant mixture was heated with stirring under normal pressure at 130–140° C. for 3 hours, whereby 90% of tin was reacted and the yield of di-n-butyl tin diiodide was 85% of theory.

What we claim is:

1. A method for the production of alkyl tin halide, comprising the steps of reacting metallic tin with alkyl halide having not more than 12 carbon atoms in the alkyl group, in the presence of an inert liquid solvent selected from the class consisting of alcohols, ethers characterized by the —O— group, esters and tetrahydrofuran, in the presence of catalyst in an amount of 0.1 to 1.0% by weight of the tin and selected from the class consisting of Mg, Al, Si, Ca, Ti, V, Cr, Mn, Fe, Co, Ni, Cu, Zn, Zr, Mo, Cd, Sb, W, Hg, Pb, Bi and Sr, and in the presence of an organometal compound of the general formula RMX in which M is the same metal as said catalyst, R is alkyl having 1 to 12 carbon atoms, and X is halogen.

2. The method for the production of alkyl tin halide, comprising the steps of reacting metallic tin with alkyl halide having not more than 12 carbon atoms in the alkyl group, in the presence of an inert liquid solvent selected from the class consisting of alcohols, ethers characterized by the —O— group, esters and tetrahydrofuran and in the presence of an organometal compound of the general formula RMX in which M is selected from the class consisting of Mg, Al, Si, Ca, Ti, V, Cr, Mn, Fe, Co, Ni, Cu, Zn, Zr, Mo, Cd, Sb, W, Hg, Pb, Bi and Sr, R is alkyl having 1 to 12 carbon atoms, and X is halogen.

3. A method as claimed in claim 2, in which M is magnesium.

4. A method as claimed in claim 2, in which X is iodide.

References Cited in the file of this patent

FOREIGN PATENTS

| 214,221 | Great Britain | July 22, 1925 |
| 695,610 | Great Britain | Aug. 12, 1953 |
| 713,727 | Great Britain | Aug. 18, 1954 |
| 736,822 | Great Britain | Sept. 14, 1955 |
| 1,069,626 | Germany | Nov. 26, 1959 |

OTHER REFERENCES

Luijten et al.: "Investigations in the Field of Organotin Chemistry," Tin Research Institute, England, October 1955, pages 27–37.